Patented June 30, 1925.

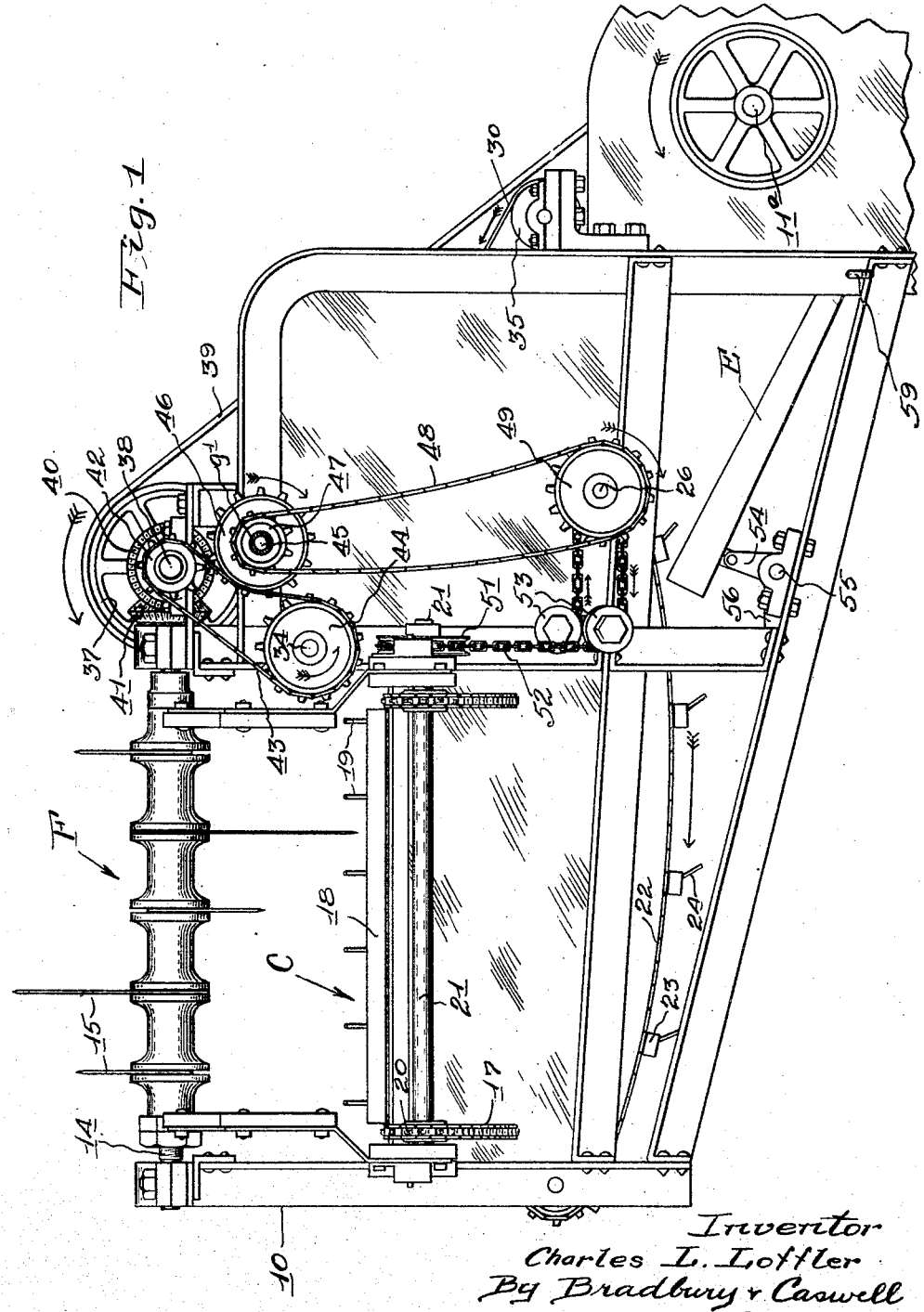

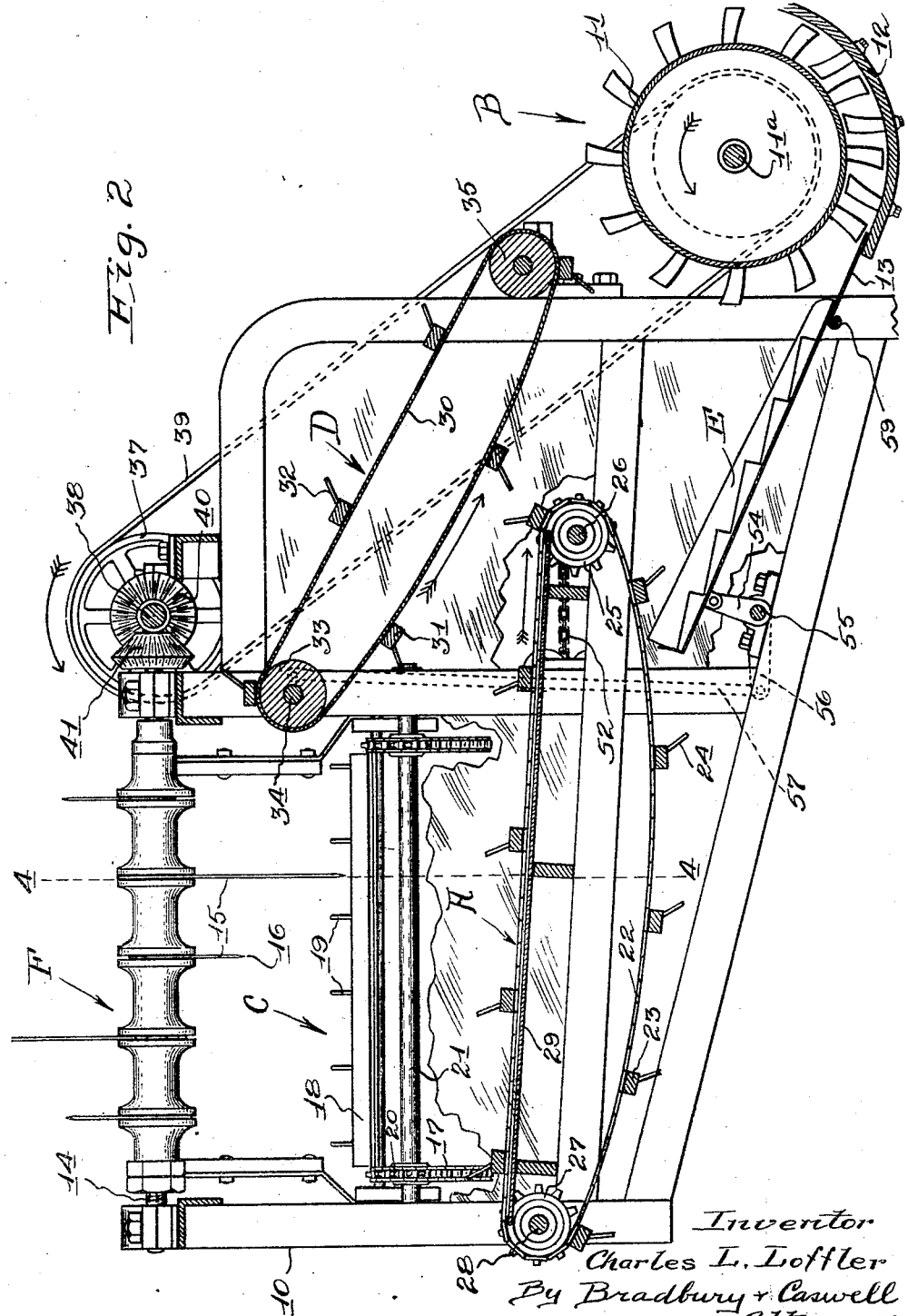

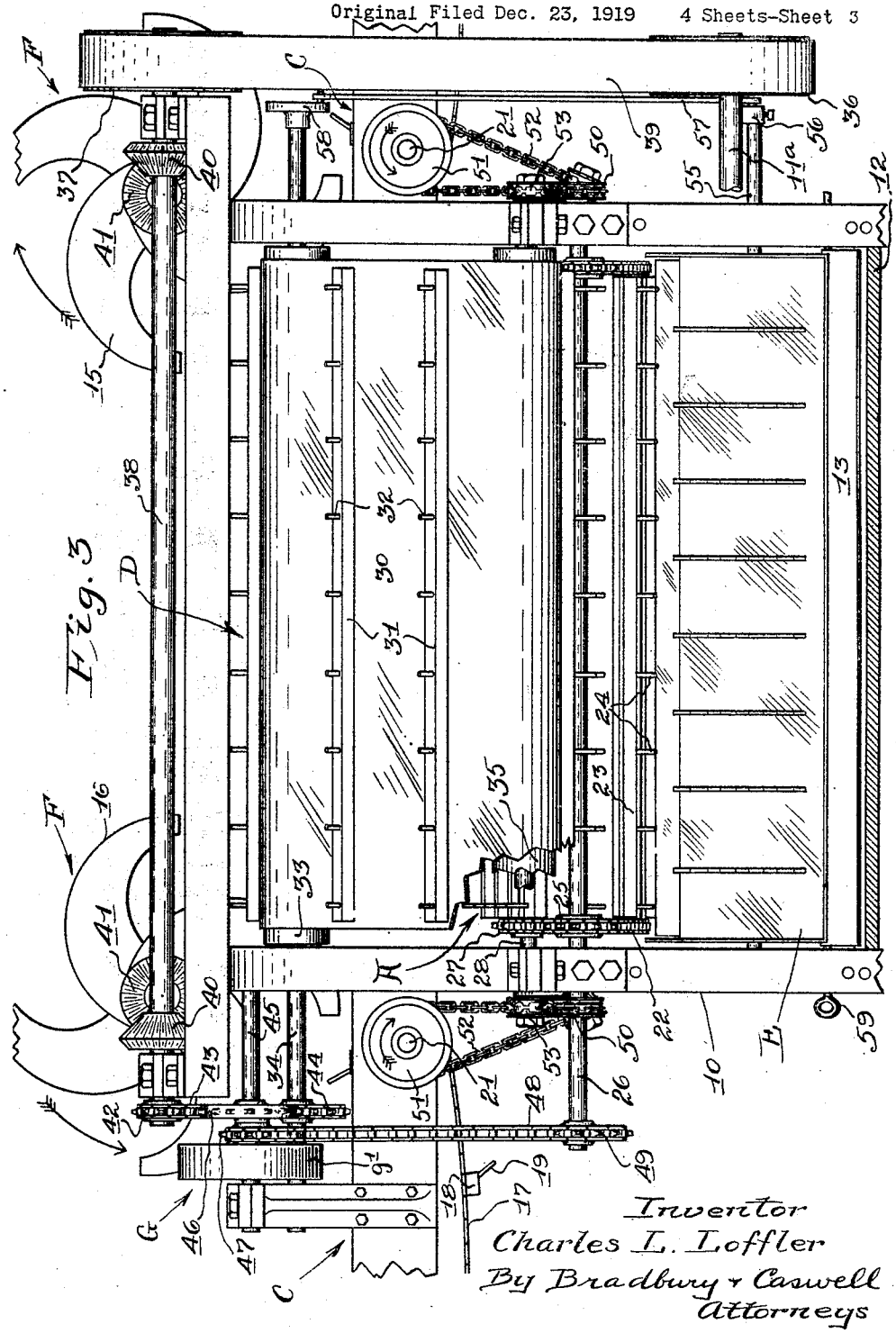

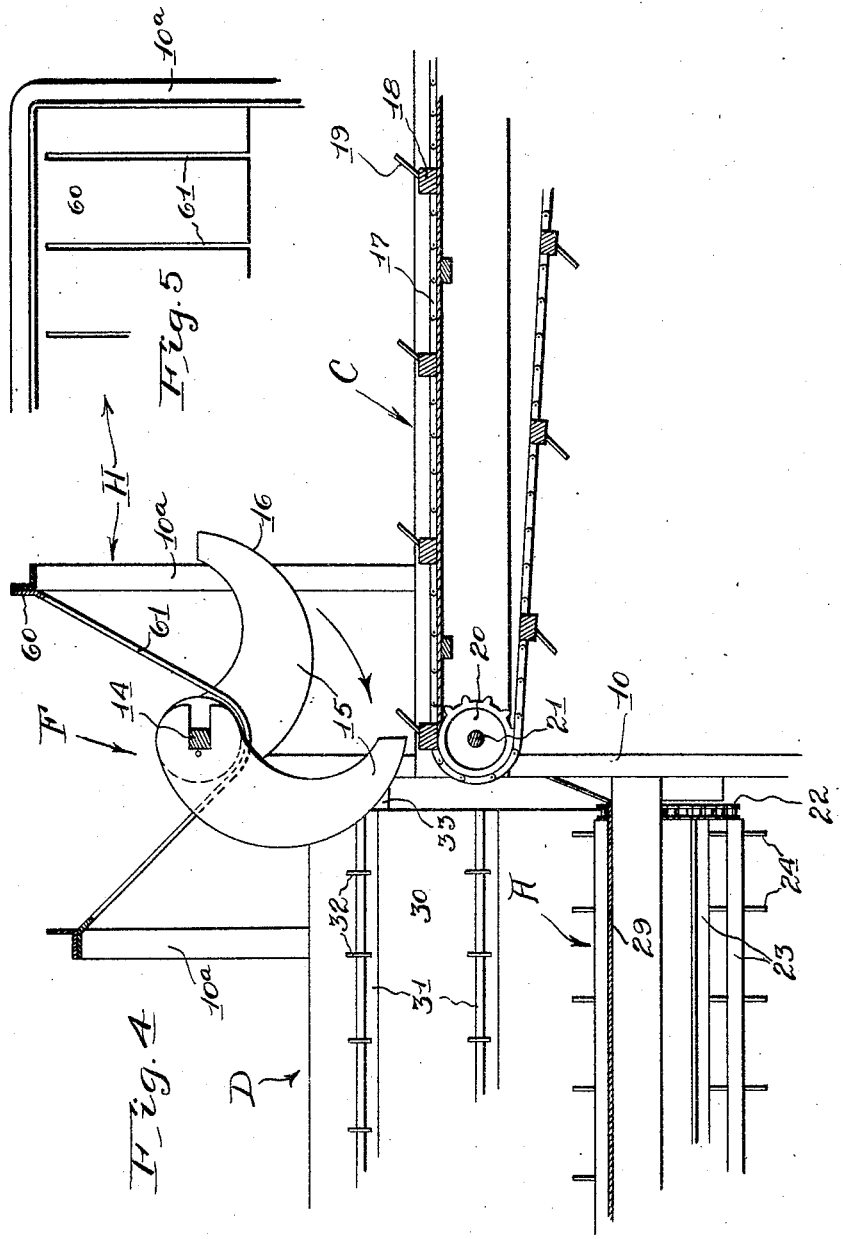

1,543,860

UNITED STATES PATENT OFFICE.

CHARLES L. LOFFLER, OF DES MOINES, IOWA, ASSIGNOR TO IOWA THRESHER COMPANY, OF DES MOINES, IOWA, A CORPORATION OF IOWA.

BAND CUTTER AND FEEDER.

Application filed December 23, 1919, Serial No. 346,955. Renewed March 5, 1925.

*To all whom it may concern:*

Be it known that I, CHARLES L. LOFFLER, a citizen of the United States, residing at Des Moines, in the county of Polk and State of Iowa, have invented a new and useful Band Cutter and Feeder, of which the following is a specification.

My invention relates to improvements in band cutters and feeders.

Its object is to provide simple, durable and easily propelled mechanism for severing the bands of bundles of grain and feeding the grain stocks evenly to the cylinder of a separator without clogging the cylinder.

A further object is to provide a device of this kind, including band knives associated with the grain carrying mechanism and adapted to co-operate therewith in such a manner that said knives not only sever the bands of bundles but loosen and distribute the grain stocks in their path toward the separating cylinder.

A further object is to provide a simple device of this kind adapted to automatically loosen and spread out the grain as it passes therethrough and to feed said grain in a steady even manner, thus eliminating the use of the ordinary retarders or straw governors to avoid the clogging or slugging of the cylinder.

With the foregoing and other objects in view, which will appear in the following description, the invention resides in the novel combination and arrangement of parts and in the details of construction hereinafter described and claimed.

In the drawing, Fig. 1 is a side elevation of a device embodying my invention, parts thereof being broken away to show mechanism otherwise concealed; Fig. 2, is a central sectional view thereof; Fig. 3 is a front elevation of the same; Fig. 4 is a sectional view taken on the line 4—4 of Fig. 2 and shows particularly the guards for the band knives, said guards having been omitted from the previous figures for the sake of clearness and Fig. 5 is a detail view showing, in elevation, a portion of one of said guards.

Referring to the drawings, I have used the reference numeral 10, to indicate a suitable hopper-like frame, which may be built in or attached to a separator structure with which my feeder is employed. A movable platform or endless carrier A carried in the frame, 10, is inclined slightly downward and terminates near the mouth of a beater B, which comprises the usual separating cylinder 11, and concaves 12. Mounted upon opposite sides of the frame 10, and extending at right angles with respect to the movable platform A are feeding conveyors C into which bundles of grain are pitched. The delivery ends of these conveyors terminate above the moving platform, the distance between said conveyors and the platform being considerably less than the length of a bundle. Above the moving platform A is a stripping rake D inclined downward beyond the delivery end of said plaform and terminating above the mouth of the beater. A shaker pan E extending beneath the delivery end of the plaform A slides at its forward margin on the lip of a removable plate 13 leading to the concave 12 of the beater. Said stripping rake D, pan E, platform A and conveyors C are driven at different speeds by mechanism hereinafter described, the conveying speed of the stripping rake and shaker pan being greater than that of the platform A and the conveying speed of the platform being greater than that of the conveyors C, which move in unison. Directly above the delivery end of each conveyor C is a band cutter F, including a knife shaft 14 journaled in suitable bearings upon the frame. Spaced knives or blades 15 presenting curved cutting edges 16 are secured to this shaft in step-like angular relation. The second blade from the cylinder follows the first blade, the third blade follows the second blade and so on, thus producing an auger like effect beginning at the end of the shaft nearest the cylinder. Said blades operate to sever the bands of bundles about to, or in the act of tipping end foremost onto the moving platform A. This cutting action of the blades is but one function thereof. After cutting the bands of the bundles and as the bundles are partially turned toward the beater B by the movement of the platform A, the blades 15 strike the elevated ends of said bundles, diagonally, the impact of said blades against the bundles completing the turning movement thereof and also serving to loosen the severed bundles and disperse the grain stocks. The striking of a bundle by the blades 15 progresses toward the elevated end of said bundle, which is first struck diagonally near its center. This is due to the rearward tipping of the bundle, by the action of the moving platform A, and also to the particular auger-like movement of the blades 15. The grain thus delivered upon the platform from the feeding conveyors is carried forward at an increased rate of speed toward the beater B and directed into said beater over the shaker-pan E. The stripping rake D travels considerably faster than the platform A and owing to its inclined position above the platform and its relatively increased speed, said rake causes any excessive quantities or bunches of grain, near the delivery end of the platform, to be stripped from the load and passed into the beater. Thus it will be seen that by progressively increasing the speed of the successive carrying elements, I eliminate the bunching or jamming of grain at the mouth of the beater and thereby avoid the so called slugging of the cylinder with its consequent loss of grain, racking of the connected machinery and the loosening and breaking of teeth in the cylinder and its companion concave. The employment of carrying elements driven at successively increasing speeds to string out the grain as it advances toward the beater also eliminates the need of retarders or straw governors commonly employed in feeders.

Each conveyor C consists of endless chains 17 carrying slats 18 with spikes 19 therein, said chains passing over suitable sprockets 20, two of which are carried by a driving shaft 21 suitably journaled in the frame 10. The movable platform A comprises a pair of endless chains 22, carrying spaced slats 23 with spikes 24 projecting therefrom. Said chains pass over sprockets 25 on a driving shaft 26, and sprockets 27, on an idler shaft 28, said shafts 26 and 28 being suitably journaled in the frame 10. A floor 29 is mounted beneath the upper reaches of said chains 22. The stripping rake D includes an endless belt or apron 30, having transverse cleats 31 thereon supplied with spikes 32. The upper end of the apron turns over a roller 33 fixed to a drive shaft 34 journaled in the frame 10, while the lower end of said apron passes over an idler roller 35 also journaled in the frame 10.

The preferred mechanism for driving the various movable parts will now be described. Power may be applied to the mechanism of my feeder from any convenient source, but to co-ordinate the movement thereof with the separating cylinder, I prefer to obtain power from the cylinder shaft 11ª. Over a pulley 36 on said shaft and over a pulley 37 on a counter shaft 38, suitably journaled in the frame, I pass a driving belt 39. The counter shaft 38 is supplied with opposed bevel gears 40 which mesh respectively with bevel gears 41 on the knife shafts 14 and turn the same in opposite directions. A sprocket wheel 42 on the end of the counter shaft 38 receives a chain 43 which meshes with a sprocket wheel 44 on the driving shaft 34, of the stripping rake D. A stub shaft 45 suitably journaled at its ends on the frame 10 carries a speed governor pulley G having the usual driving member (not shown) and driven member $g^1$, the former being fixed to said shaft 45. A sprocket wheel 46 upon the shaft 45 meshes with the lower reach of the sprocket chain 43 and is driven thereby. The driven member $g^1$, of said speed governor pulley carries a sprocket wheel 47. A chain 48, passing over said sprocket wheel 47 meshes with a larger sprocket 49 on the drive shaft 21, of the moving platform A. Recessed pulleys 50 on said shaft 26 and similar but larger pulleys 51, on the driving shafts 21 of the conveyors C receive drive chains 52 which are directed over suitable idler rollers 53 and propel said conveyors. The shaker-pan E is pivotally carried near its upper corners by upright arms 54 secured to a rock shaft 55 journaled in the frame 10. A rock arm 56 on said shaft is joined through a pitman rod 57 with a crank 58 upon the driving shaft 34 of the stripping rake D. The turning of this crank 58 operates to rapidly reciprocate the shaker-pan E, which movement urges material from the pan into the beater. The carrying speed of the shaker-pan like that of the stripping rake D is greater than the carrying speed of the moving platform A.

From the foregoing it will be noted that the band knives 15, stripping rake D and shaker pan E are driven directly from the cylinder shaft 11ª, and start and stop therewith. The moving platform A and the conveyors C are propelled through the driven member $g^1$, of the speed governor pulley G, which may be adjusted to require any desired speed of the band knives 15, stripping rake D and shaker pan E prior to the engagement of the driven member of said pulley with the driving member thereof. In practice the adjustment of the speed governor pulley is such that, in starting, the moving platform A and conveyors C begin to move, when the cylinder and band knives reach their normal operative speed and, in stopping, said platform and conveyors cease advancing when said cylinder and band knives lose their normal operating speed. By thus making the movement of the conveyors C and moving platform A dependent upon a predetermined speed of the cylinder and band knives, I avoid carrying grain to the cylinder or bundles to the band knives before said cylinder and knives have attained sufficient speed for properly functioning. In stopping or in slowing down an attached separator, this control provides for clearing the conveyors C adjacent to the band knives 15 and also clearing the beater B and the entrance thereto. It will, therefore, be seen that in starting my feeder the moving parts may turn freely without clogging or jamming and after the mechanism is stopped that the band knives 15 are conveniently accessible as well as the cylinder 11, which may be readily reached by first withdrawing the removable rod 59, from the frame 10, thus freeing the plate 13 and the lower end of the shaker pan E.

The band knives 15 are so arranged that the tips thereof swing closely adjacent to the conveyor therebeneath. The cutting edges 16, of said knives are curved and extend from the supporting shaft 14 to the tips thereof, thus causing a sliding cutting action which effectually severs the bands of bundles and splits said bundles. I supply a guard H for each knife shaft, which consists of a sheet metal plate 60 having slots 61 therein. This plate is supported at its transverse margins upon frame members 10$^a$ above the shaft 14. Said plate passes beneath said shaft, the slots 61 receiving the blades 15. The forward side of each guard forms a buffer to hold bundles from the shaft and direct said bundles beneath said shaft. The rear side of the guard strips grain stocks from the blades 15 and prevents said stocks from winding upon the knife shaft. Said buffer prevents the introduction of grain to the moving platform A, except by the conveyors C, which carry the bundles beneath the knife shafts at a predetermined rate of speed. Overloading of the conveyors by inexperienced or careless pitchers is automatically taken care of at the delivery ends of said conveyors by these guards, which temporarily hold back excessive quantities of grain until the same may pass normally therefrom.

Changes in the specific form of my invention, as herein disclosed, may be made within the scope of what is claimed, without departing from the spirit of my invention.

Having described my invention, what I claim as new and desire to protect by Letters Patent is:

1. In a device of the class described, a beater, an endless carrier emptying into the beater, a feeding conveyor leading to said endless carrier at right angles with respect thereto, the delivery end of said conveyor terminating above the platform at an elevation less in extent than the length of a bundle, rotary band knives above the delivery end of the conveyor arranged to cut the bands of bundles before the travel thereof is effected by the endless carrier and, after the bundles are tilted and later turned by said endless carrier, to strike the elevated ends of the bundles diagonally and thereby loosen and distribute the stocks thereof longitudinally upon said endless carrier, a stripping rake, above the endless carrier, inclined downwardly toward the beater, means for driving the beater, band cutter, stripping rake, endless carrier and conveyor, said means including mechanism for propelling the endless carrier and conveyor only during efficiently operative speeds of the remaining elements.

2. In a device of the class described, a beater, an endless carrier emptying into the beater, a feeding conveyor leading to the endless carrier and arranged at right angles with respect thereto, the delivery end of said conveyor terminating above the endless carrier at an elevation less in extent than the length of a bundle, rotary band knives above the delivery end of the conveyor arranged to cut the bands of bundles before the travel thereof is effected by the endless carrier and, after the bundles are tilted and later turned by said endless carrier to strike the elevated ends of the bundles diagonally and by impact loosen and disperse the grain stocks upon the endless carrier.

3. In a device of the class described, a beater, an endless carrier emptying into said beater, a feeding conveyor at right angles with respect to the endless carrier, the delivery end of said conveyor terminating above the endless carrier at an elevation less in extent than the length of a bundle, a knife shaft extending transversely above the discharge end of said conveyor, spaced knives on said shaft relatively located in auger-like fashion, the second knife from one end of the shaft following the first knife, the third knife following the second knife and so on, said knives being arranged to sever the bands of bundles as they tip end foremost onto the platform and, as the severed bundles are turned toward the beater by the endless carrier to strike said bundles in succession, at increasing angles, progressing toward the elevated ends thereof, thereby spreading the grain stocks longitudinally upon said movable endless carrier.

In testimony whereof, I have signed my name to this specification.

CHARLES L. LOFFLER.